(12) United States Patent
Miyazaki

(10) Patent No.: US 8,762,973 B2
(45) Date of Patent: Jun. 24, 2014

(54) INFORMATION PROCESSING APPARATUS, METHOD OF CONTROLLING INFORMATION PROCESSING APPARATUS, AND PROGRAM FOR EXECUTING INTERMEDIATE CODE INSTRUCTIONS

(75) Inventor: Kiyoshi Miyazaki, Machida (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 13/591,770

(22) Filed: Aug. 22, 2012

(65) Prior Publication Data

US 2013/0067442 A1    Mar. 14, 2013

(30) Foreign Application Priority Data

Sep. 13, 2011   (JP) .................................. 2011-199986

(51) Int. Cl.
   *G06F 9/45*   (2006.01)
(52) U.S. Cl.
   USPC .......................................... 717/148; 717/146
(58) Field of Classification Search
   None
   See application file for complete search history.

(56) References Cited

U.S. PATENT DOCUMENTS

| | | | | |
|---|---|---|---|---|
| 5,946,487 | A * | 8/1999 | Dangelo ........................ | 717/148 |
| 6,081,665 | A * | 6/2000 | Nilsen et al. .................. | 717/116 |
| 6,530,075 | B1 * | 3/2003 | Beadle et al. ................. | 717/114 |
| 7,725,885 | B1 * | 5/2010 | Pradhan et al. ............... | 717/148 |
| 7,958,499 | B2 | 6/2011 | Doi | |
| 8,201,026 | B1 * | 6/2012 | Bornstein et al. .............. | 714/45 |
| 8,359,496 | B1 * | 1/2013 | Bornstein et al. .............. | 714/45 |
| 2002/0104076 | A1 * | 8/2002 | Shaylor .......................... | 717/148 |
| 2002/0147969 | A1 * | 10/2002 | Lethin et al. .................. | 717/138 |
| 2004/0083467 | A1 * | 4/2004 | Hanley et al. ................. | 717/148 |
| 2007/0226714 | A1 * | 9/2007 | Doi ............................... | 717/148 |
| 2007/0271553 | A1 * | 11/2007 | Higgins et al. ................ | 717/136 |
| 2010/0262952 | A1 * | 10/2010 | Colton et al. .................. | 717/118 |
| 2011/0131548 | A1 * | 6/2011 | Colton et al. .................. | 717/106 |
| 2013/0067442 | A1 * | 3/2013 | Miyazaki ....................... | 717/139 |

FOREIGN PATENT DOCUMENTS

| | | |
|---|---|---|
| JP | 2004-355277 | 12/2004 |
| JP | 2005-108126 | 4/2005 |

* cited by examiner

*Primary Examiner* — Don Wong
*Assistant Examiner* — Marina Lee
(74) *Attorney, Agent, or Firm* — Fujitsu Patent Center

(57) ABSTRACT

The CPU includes a byte code interpretation unit that sequentially reads intermediate code instructions along an execution route, determining whether or not there is a compilation result of the read intermediate code instruction in the compilation result storage unit, interpreting the intermediate code instruction when there is no compilation result, and designating the compilation result if there is a compilation result; and a program execution unit that, if received the interpretation result of the intermediate code instruction from the byte code interpretation unit, executes the intermediate code instruction and, if received the designation of the compilation result, executes the program by executing designated native code. The CPU includes a compilation execution unit that compiles the intermediate code instruction interpreted by the byte code interpretation unit to generate the native code and stores them in the compilation result storage unit.

5 Claims, 11 Drawing Sheets

| EXECUTION FLAG | | | |
|---|---|---|---|
| 0 | 0 | 1 | 1 |

| COMPILATION STATE FLAG | | |
|---|---|---|
| 0 | 0 | 1 |

```
public class TestLoop { static int method1(int i, int j)
  {
  //  0   0:iconst_0                                          ⎫
  //  1   1:istore_2                                          ⎬ 501
  //  2   2:iload_2                                           ⎭
  //  3   3:bipush          100                               ⎫
  //  4   5:if_icmpge       18                                ⎬ 502
  //  5   8:invokestatic    #2   <Method long System.currentTimeMillis()>  ⎫
  //  6  11:pop2                                              ⎬ 503
  //  7  12:iinc            2 1                               ⎭
  //  8  15:goto            2
  //  9  18:iload_0                                           ⎫
  // 10  19:iload_1                                           ⎬ 504
  // 11  20:iadd                                              ⎭
  // 12  21:ireturn
  } public static void main(String args[])
  {
  //  0   0:iconst_0                                          ⎫
  //  1   1:istore_1                                          ⎬ 511
  //  2   2:iload_1                                           ⎭
  //  3   3:ldc1            #3   <Int 0xf4240>                ⎫
  //  4   5:if_icmpge       21                                ⎬ 512
  //  5   8:iload_1                                           ⎫
  //  6   9:bipush          7                                 ⎬ 513
  //  7  11:invokestatic    #4   <Method int method1(int, int)>  ⎭
  //  8  14:pop                                               ⎫
  //  9  15:iinc            1 1                               ⎬ 514
  // 10  18:goto            2                                 ⎭
  // 11  21:return
  }
}
```

FIG.10A

```
public class TestLoop {
  static int method1(int i, int j)
55              LM1:
56                    LFBB2:
57 001a 55                 pushl    %ebp                              ⎫
58 001b 89E5               movl     %esp, %ebp                        ⎪
59 001d 83EC28             subl     $40, %esp                         ⎪
60 0020 C70424A0           movl     $__ZN8TestLoop6class$E, (%esp)    ⎬ 701
60     000000                                                         ⎪
61 0027 E8000000           call     __Jv_InitClass                    ⎪
61     00                                                             ⎭
62 002c C745E400           movl     $0, -28(%ebp)                     ⎫
62     000000                                                         ⎪
63 0033 8B45E4             movl     -28(%ebp), %eax                   ⎪
64 0036 8945E8             movl     %eax, -24(%ebp)                   ⎪
65          L4:                                                       ⎪
66 0039 8B55E8             movl     -24(%ebp), %edx                   ⎪
67 003c 8955F4             movl     %edx, -12(%ebp)                   ⎬ 702
68 003f 8B45F4             movl     -12(%ebp), %eax                   ⎪
69 0042 8945E4             movl     %eax, -28(%ebp)                   ⎪
70 0045 C745EC64           movl     $100, -20(%ebp)                   ⎪
70     000000                                                         ⎪
71 004c 8B45E4             movl     -28(%ebp), %eax                   ⎪
72 004f 3B45EC             cmpl     -20(%ebp), %eax                   ⎪
73 0052 7D10               jge      L5                                ⎪
74 0054 E8000000           call     __ZN4java4lang6System17currentTimeMillisEJxv
74     00
75 0059 8B45E8             movl     -24(%ebp), %eax                   ⎫
76 005c 83C001             addl     $1, %eax                          ⎪
77 005f 8945E8             movl     %eax, -24(%ebp)                   ⎬ 703
78 0062 EBD5               jmp      L4                                ⎭
79          L5:
80 0064 8B4508             movl     8(%ebp), %eax                     ⎫
81 0067 8945F8             movl     %eax, -8(%ebp)                    ⎪
82 006a 8B55F8             movl     -8(%ebp), %edx                    ⎪
83 006d 8955E4             movl     %edx, -28(%ebp)                   ⎪
84 0070 8B450C             movl     12(%ebp), %eax                    ⎪
85 0073 8945FC             movl     %eax, -4(%ebp)                    ⎪
86 0076 8B45FC             movl     -4(%ebp), %eax                    ⎪
87 0079 8945EC             movl     %eax, -20(%ebp)                   ⎬ 704
88 007c 8B45E4             movl     -28(%ebp), %eax                   ⎪
89 007f 8B55EC             movl     -20(%ebp), %edx                   ⎪
90 0082 01C2               addl     %eax, %edx                        ⎪
91 0084 8955E4             movl     %edx, -28(%ebp)                   ⎪
92 0087 8B45E4             movl     -28(%ebp), %eax                   ⎪
93 008a C9                 leave                                      ⎪
94 008b C3                 ret                                        ⎭
```

FIG.10B

```
public static void main(String args[])
105         LM2:
106             LFBB3:
107 008c 55            pushl      %ebp              ⎫
108 008d 89E5          movl       %esp, %ebp        ⎪
109 008f 83EC28        subl       $40, %esp         ⎪
110 0092 C70424A0      movl       $__ZN8TestLoop6class$E, (%esp)
110     000000                                      ⎪
111 0099 E8000000      call       __Jv_InitClass    ⎪
111     00                                          ⎪
112 009e C745E400      movl       $0, -28(%ebp)     ⎪
112     000000                                      ⎬ 705
113 00a5 8B45E4        movl       -28(%ebp), %eax   ⎪
114 00a8 8945E8        movl       %eax, -24(%ebp)   ⎪
115         L9:                                     ⎪
116 00ab 8B45E8        movl       -24(%ebp), %eax   ⎪
117 00ae 8945F8        movl       %eax, -8(%ebp)    ⎪
118 00b1 8B45F8        movl       -8(%ebp), %eax    ⎪
119 00b4 8945E4        movl       %eax, -28(%ebp)   ⎪
120 00b7 C745EC40      movl       $1000000, -20(%ebp)
120     420F00                                      ⎪
121 00be 8B45E4        movl       -28(%ebp), %eax   ⎪
122 00c1 3B45EC        cmpl       -20(%ebp), %eax   ⎪
123 00c4 7D30          jge        L12               ⎭
124 00c6 8B45E8        movl       -24(%ebp), %eax   ⎫
125 00c9 8945FC        movl       %eax, -4(%ebp)    ⎪
126 00cc 8B45FC        movl       -4(%ebp), %eax    ⎪
127 00cf 8945E4        movl       %eax, -28(%ebp)   ⎪
128 00d2 C745EC07      movl       $7, -20(%ebp)     ⎪
128     000000                                      ⎬ 706
129 00d9 8B45EC        movl       -20(%ebp), %eax   ⎪
130 00dc 89442404      movl       %eax, 4(%esp)     ⎪
131 00e0 8B45E4        movl       -28(%ebp), %eax   ⎪
132 00e3 890424        movl       %eax, (%esp)      ⎪
133 00e6 E82FFFFF      call       __ZN8TestLoop7method1EJiii
133     FF                                          ⎭
134 00eb 8B45E8        movl       -24(%ebp), %eax   ⎫
135 00ee 83C001        addl       $1, %eax          ⎬ 707
136 00f1 8945E8        movl       %eax, -24(%ebp)   ⎪
137 00f4 EBB5          jmp        L9                ⎭
138         L10:
139         L12:
140 00f6 C9            leave                        ⎫ 708
141 00f7 C3            ret                          ⎭
```

INFORMATION PROCESSING APPARATUS, METHOD OF CONTROLLING INFORMATION PROCESSING APPARATUS, AND PROGRAM FOR EXECUTING INTERMEDIATE CODE INSTRUCTIONS

CROSS-REFERENCE TO RELATED APPLICATION

This application is based upon and claims the benefit of priority of the prior Japanese Patent Application No. 2011-199986, filed on Sep. 13, 2011, the entire contents of which are incorporated herein by reference.

FIELD

The present embodiment discussed herein is directed to an information processing apparatus, a method of controlling the information processing apparatus, and a program for executing intermediate code instructions.

BACKGROUND

Several methods are conventionally known for executing the Java™ programs by information processing apparatus.

As one of the methods, a scheme called as the interpreter scheme is known. In the interpreter scheme, the information processing apparatus compiles a source file to convert it into an intermediate code called as the Java byte code. Then, the information processing apparatus executes the program by interpreting the Java byte code by the Java VM (Virtual Machine) and executing processes at the CPU (Central Processing Unit) based on that interpretation.

As other method, a scheme referred to as the accelerator scheme is known. The accelerator scheme is a scheme to execute the Java bite code by a hardware. For example, a part of the Java byte code in the program is executed by the hardware, while the execution of the Java byte code which performs relatively complicated operation is executed by software. Generally, the accelerator scheme can execute the process at a higher speed compared to the interpreter scheme.

Further, as other method, a scheme referred to as the JIT (Just In Time) compiler scheme is known. The JIT compiler scheme is a scheme to directly execute the execution code by the CPU while compiling the Java byte code by part by part to convert it into an execution code (also referred to as a native code). In the JIT compiler scheme, successive Java byte codes can be optimized and complied (execution instruction expansion), so that the compilation result can be executed at a high speed.

Further, the following conventional arts have been known as techniques for reducing time for the execution of the program. First, a related art has been known that performs the byte code execution and the compilation process in parallel by using multi-task process in a single CPU system (for example, Japanese Laid-open Patent Publication No. 2004-355277). Second, a related art has been known in which one CPU expresses a Java program as an intermediate code while another CPU performs compilation in a unit of class file and the another CPU executes the compilation result (for example, Japanese Laid-open Patent Publication No. 2005-108126).

In the related interpreter schemes, however, since the program is executed while the Java byte code is interpreted during execution period, the execution of the individual process becomes slower, which results in longer total time for the execution of the program. Therefore, it has been difficult to efficiently perform the execution of the Java program.

In the related accelerator scheme, it is requested to implement the hardware Java accelerator circuit, which becomes costly. Further, it is difficult for redundant processes, if any, to be optimized when executing the instruction at the hardware circuit and thus the execution of the process becomes slower, which results in longer total time for the execution of the program. Therefore, it has been difficult to efficiently perform the execution of the Java program.

Further, in the JIT compile scheme, the time for compiling the Java byte code is requested. The Java program performs compilation in a unit of class file of the Java byte code or in a unit of process included in the class file (called as "method") and, upon the completion of compiling the class file or the method, calls and executes the process. Thus, for a lengthy class file or method, compilation takes longer time causing the delay of the start of the process, which results in longer total time for the execution of the program. Further, in the lengthy class file or method, the process to be actually executed is a part of the class file or method in many cases. In this case, there is a problem of taking time for unnecessary compiling process. Therefore, it has been difficult to efficiently perform the execution of the Java program.

Furthermore, in the first related art, malfunction may occur due to the replacement of the queues of the compilation request when a plurality of CPUs are used, so that adaptation to the multi-core system has been difficult. Therefore, it is difficult for the compilation and the execution of the Java byte code to be performed in parallel resulting in longer total time for the execution of the program due to the time for the compilation. Therefore, it has been difficult to efficiently perform the execution of the Java program.

Further, in the second related art, it is difficult to adapt it to the compilation performed in a unit of block such as a method, because the timing of the compilation and the operation such as the passing operation of the compilation result are unclear. In the compilation performed in a unit of class, there has been a concern that the redundant compilation may likely occur, still resulting in longer total time for the execution of the program. Therefore, it has been difficult to efficiently perform the execution of the Java program.

SUMMARY

According to an aspect of the embodiments, an information processing apparatus includes at least two CPUs and a storage unit for storing a compilation result of an intermediate code instruction. One CPU includes an intermediate code interpretation unit for sequentially reading, from a predetermined program described with intermediate code instructions, the intermediate code instructions along an execution route that is an order to execute each intermediate code instruction; determining whether or not there is a compilation result of the intermediate code instruction that has been read in the storage unit; when there is no compilation result of the intermediate code instruction, interpreting the intermediate code instruction; and, when there is a compilation result of the intermediate code instruction, designating the compilation result; and a program execution unit for, when an interpretation result of the intermediate code instruction is received from the intermediate code interpretation unit, executing the program by executing the intermediate code instruction based on the interpretation result and, when a designation of a compilation result is received from the intermediate code interpretation unit, executing a native code that is the designated compilation result. the other CPU includes a compilation execution unit for compiling the intermediate code instruction interpreted by the intermediate code interpretation unit to generate a native code and storing the generated native code in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for illustrating an execution flag;
FIG. 4 is a diagram for illustrating a compilation state flag;
FIG. 8 is a diagram illustrating an abstract of the Java compilation result of the sample program;
FIG. 10A is a first diagram illustrating an execution code generated from the sample program;
FIG. 10B is a second diagram illustrating an execution code generated from the sample program.

DESCRIPTION OF EMBODIMENTS

Preferred embodiments will be explained with reference to accompanying drawings. It is noted that the information processing apparatus, the method for controlling the information processing apparatus, and the program for executing intermediate code instructions as disclosed by the present application are not limited by the following embodiment. In particular, although the following descriptions will be provided with an example of the Java program, the present invention may be applied to other programs as long as these programs use the intermediate code for execution.

Figure 1:
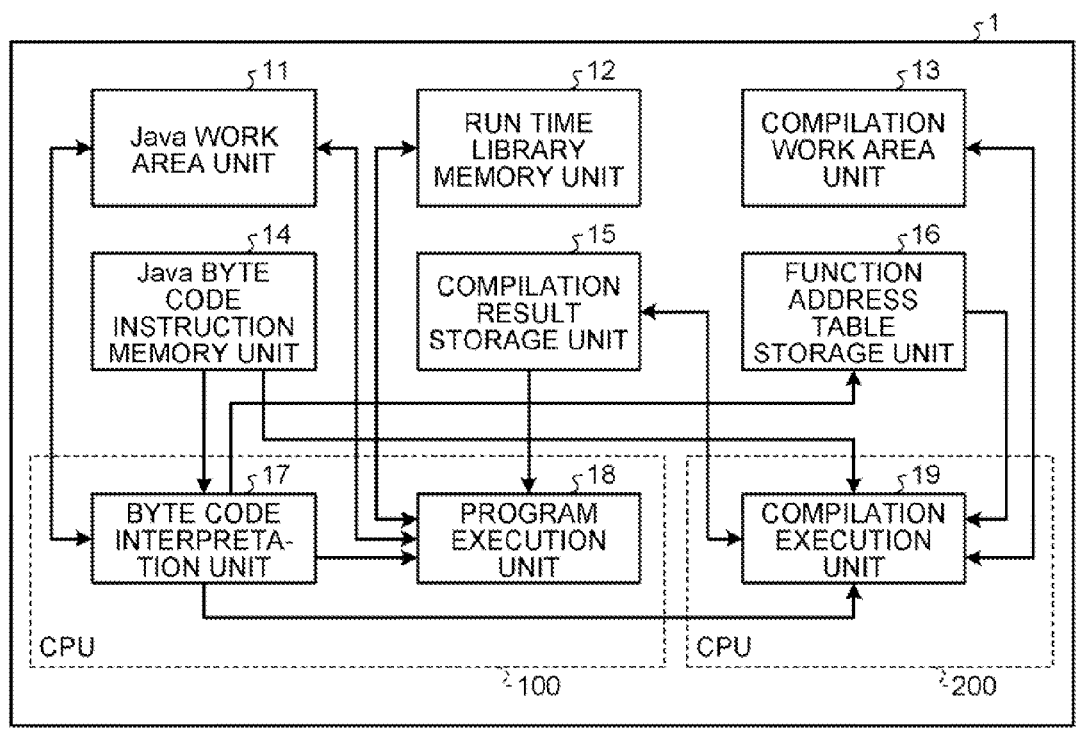
FIG. 1 is a block diagram of an information processing apparatus according to an embodiment.

FIG. 1 is a block diagram of the information processing apparatus according to an embodiment. As illustrated in FIG. 1, an information processing apparatus 1 of the present embodiment has a Java work area unit 11, a run time library memory unit 12, a compilation work area unit 13, a Java byte code instruction memory unit 14, a compilation result storage unit 15, a function address table storage unit 16, a byte code interpretation unit 17, a program execution unit 18 and a compilation execution unit 19.

The blocks within the dotted lines in FIG. 1 represent the blocks whose functions are implemented by a CPU 100 and a CPU 200. The functions of the byte code interpretation unit 17 and the program execution unit 18 are implemented by the CPU 100. The function of the compilation execution unit 19 is implemented by the CPU 200. That is, the processes in the byte code interpretation unit 17 and the program execution unit 18 and the process in the compilation execution unit 19 are performed by the different CPUs. In FIG. 1, the configuration depicted outside the blocks enclosed by the dotted lines may be implemented by storage means provided inside the CPU 100 or the CPU 200, or may be implemented by storage means provided outside the CPU 100 and the CPU 200.

The Java work area unit 11 is a storage area used while the process such as calculation is being performed in the execution of the Java program. For example, the data on the way of calculation is once stored in the Java work area unit 11 and, afterward, is again used for the calculation. When the data stored in the Java work area unit 11 is again used for the calculation, the data is read out from the Java work area unit 11 and the data that has been stored in the Java work area unit 11 is deleted. As mentioned, the Java work area unit 11 is temporarily used as a place for reading out and writing the data while the Java program is being executed.

The run time library memory unit 12 stores a group of predefined functions for executing the Java program.

The compilation work area unit 13 is a storage area that is used while the compiling process is being performed. For example, the data on the way of compilation process is once stored in the compilation work area unit 13 and, afterward, is again used for the compiling process. When the data stored in the compilation work area unit 13 is again used for the compiling process, the data is then read out from the compilation work area unit 13 and the data that has been stored in the compilation work area unit 13 is deleted. As such, the compilation work area unit 13 is temporarily used as a place for reading out and writing the data while the compiling process is being executed.

The Java byte code instruction memory unit 14 stores a Java program described with the Java byte code. This Java program described with the Java byte code (class file) is generated by compiling the source code described in the Java programming language and converting them into the Java byte code that is the intermediate code. Hereafter, the instruction included in the Java program described with the Java byte code is referred to as "Java byte code instruction". In general, the Java byte code instruction is not an instruction set that can be directly executed by the CPU, but a virtual instruction set that is defined by the Java virtual machine specification. Thus, it is executed by the CPU after interpreted to an instruction set that can be executed by the CPU according to the operation environment at the time of execution.

The compilation result storage unit 15 stores a compilation result of the Java byte code instruction that has been executed by the compilation execution unit 19 described later.

The function address table storage unit 16 stores a function address table in which addresses of the functions used in compilation are listed. Further, the function address table storage unit 16 stores a method address table that is generated by the byte code interpretation unit 17 described later. The method address table will be described later in detail.

The byte code interpretation unit 17 is implemented by the Java VM. Once the start of the execution of the Java program is instructed, the byte code interpretation unit 17 sequentially reads the Java program described with the Java byte code from the Java byte code instruction memory unit 14.

Then, the byte code interpretation unit 17 sequentially interprets the Java byte code instruction described in the read Java program (class file). The Java program read by the byte code interpretation unit 17 may include a process called as the run time library file. In the class file, the procedure (process) called as the method is defined. The method corresponds to an example of "intermediate code instruction group". In the method, the process from the beginning to the end is described. The end of the process in the method is designated by, for example, the "return" instruction (for example, the byte code such as 0xb1).

If a call instruction for the method appears when sequentially interpreting the Java byte code instruction, the byte code interpretation unit 17 obtains the start address of the called method. The start address of the called method refers to the memory address where the instruction that is the starting point of the method is stored. Then, the byte code interpretation unit 17 defines the obtained method start address as an entry point.

The byte code interpretation unit 17 searches whether or not the found method is registered in the method address table stored in the function address table storage unit 16. If the method is not registered in the method address table, the byte code interpretation unit 17 newly reserves an area of the element expressing the method in the method address table.

Afterward, the byte code interpretation unit 17 registers various types of information such as a method name, an entry point table, and so on to the element area reserved in the method address table. Here, before describing the registration of the various types of information to the method address table by the byte code interpretation unit 17, the method address table will be described.

Figure 2:
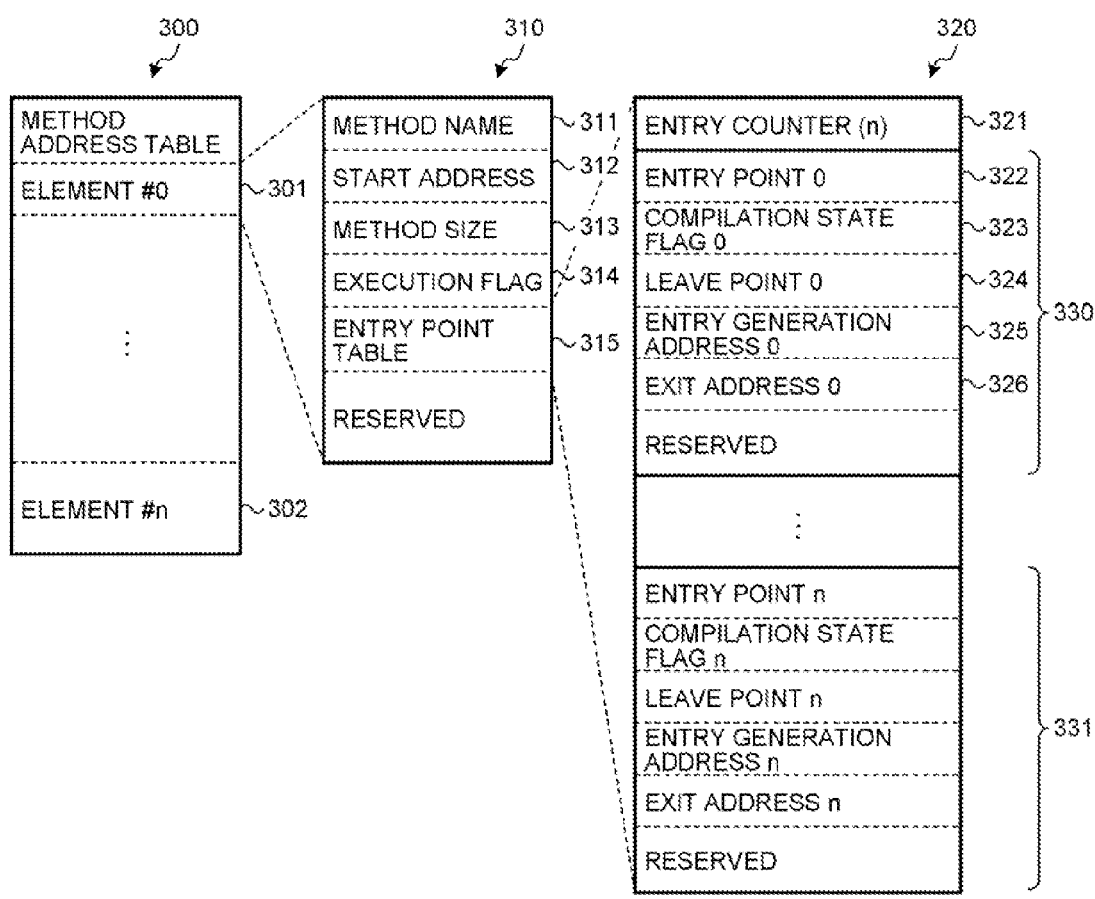
FIG. 2 is a diagram for illustrating a method address table.

FIG. 2 is a diagram for illustrating the method address table. A table 300 depicted in FIG. 2 presents the general frame of the method address table. A table 310 represents the data structure of each element of the method address table. Further, a table 320 represents the data structure of an entry point table 315 described in the elements.

In the method address table, areas for respective elements are reserved with serial numbers correspondingly to the methods included in the Java program to be executed. The byte code interpretation unit 17 assigns No. 0 to the method that is first found after starting the execution of the Java program, and reserves an area 301 for the element #0 in the method address table. Also, if the area of the element in the method address table has already been reserved, the byte code interpretation unit 17 assigns the number next to the largest number that has already been used for other method and reserves the area for the element attached with that number. For example, in the case of the n-th found method, an area 302 of the element #n is reserved for the method. In such a manner, the byte code interpretation unit 17 assigns numbers to the found methods in a serial manner for every time when a method is found, and reserves the areas of the elements attached with those numbers in the method address table.

Further, the area of the element is registered with a method name 311, a start address 312, a method size 313, an execution flag 314 and the entry point table 315 as depicted in the table 310. In FIG. 2, although the element #0 is depicted as an example, the byte code interpretation unit 17 creates the method address table such that other elements have the same data structure. Hereafter, the method name 311, the start address 312, the method size 313, the execution flag 314 and the entry point table 315 will be described as the data corresponding to an arbitrary method.

The method name 311 is a name of the method corresponding to the element. Upon reserving an area of the element, the byte code interpretation unit 17 registers the method name corresponding to the element for the method name 311.

The start address 312 is a start address of the method corresponding to the element. Upon the completion of compiling the method, the compilation execution unit 19 described later registers the start address of the method for the start address 312.

The method size 313 is a size of the method corresponding to the element. Upon reserving the area of the element, the byte code interpretation unit 17 identifies the size from the top of the method to the "return" instruction and registers the identified size for the method size 313 as a size of the method corresponding to the element.

The execution flag 314 has flags 341 to 344 as depicted in FIG. 3, for example. For each of the flags 341 to 344, it is ON if the written value is 1, while it is OFF if the written value is 0. The flag 341 is a flag representing whether or not the optimization has been completed. If the flag 341 is ON, this represents that the optimization has been completed for the method. Here, the optimization refers to unifying the compilation results of the successively called processes, for example. The flag 342 is a flag indicating whether or not the optimization is executed when there are calls from a plurality of portions. If the flag 342 is ON, this represents that there are calls from a plurality of portions. The flag 343 is a flag representing whether or not the method call address has been set to the method address table. If the flag 343 is ON, this represents that the call address of the execution code that is the compilation result has set the method in the Java program. The flag 344 represents whether or not the compilation has been done. If the flag 344 is ON, this represents that the method has already been compiled. For example, according to the state of the execution flag 314 as depicted in FIG. 3, the flag 343 and the flag 344 are ON, which indicates that the compilation has been done and the method call address has been set. The flags 341 to 344 are set by the compilation execution unit 19 described later. The details of the setting of the flags 341 to 344 by the compilation execution unit 19 will be described later.

Next, the entry point table 315 will be described. As depicted in the table 320, the entry point table 315 has an entry counter 321 that indicates how many entries there are for the method. The entry refers to a unit on the basis of which the compilation process is performed by the compilation execution unit 19. The unit of compilation is designated by the byte code interpretation unit 17 as described later. This entry is an example of "division instruction group".

Here, the unit of compilation will be described. For example, if the compilation execution unit 19 compiles a particular method from the starting point of the method to the return instruction all at once, the number of the entry for that method will be one. Also, as described later, if a branch such as for calling other method within a method has been designated by the byte code interpretation unit 17, the part from the start of the method to the branch will be one unit of compilation and thus is one entry. For example, the call instruction such as (0xB6) "invokevirtual" or a part to the branch such as (0xA7) "goto" instruction can be one unit of compilation. Further, after other method is called and then it returns back to the previous method that occurred before the call, if other branch is further designated by the byte code interpretation unit 17, the part from the return position to the next branch will be one unit of compilation and thus is one entry. After returning, if the return instruction is reached without having any branch, the part to the return instruction from the return position where the flow has returned will be one unit of compilation and thus is one entry.

Further, the data structure of each entry in the entry point table 315 will be described. Although FIG. 2 depicts the entry with an example of the first (0-th) entry 330 and the n-th entry 331, all the entries from 0 to n are described in the entry point table 315.

An entry point 322 represents the address in the Java byte code of the start of the entry.

A compilation state flag 323 is a flag indicating the compilation state of the entry. FIG. 4 is a diagram for illustrating the compilation state flag. In this embodiment, the compilation state flag 323 is provided with flags 351 to 353.

The flag 351 is a flag representing whether or not the optimization has been done. The flag 352 is a flag representing whether or not the compilation is ongoing. The flag 353 is a flag representing whether or not the compilation has been done. The flags 351 to 353 are set by the compilation execution unit 19. The setting of the flags 351 to 353 by the compilation execution unit 19 will be described later.

A leave point 324 represents an address in the Java byte code of the branch that is the end point of the entry. For example, the end point of the entry may be a call instruction such as (0xB1) "return" instruction and (0xB6) "invokevirtual", or a position (address) where the instruction code such as (0xA7) "goto" instruction that changes the flow of the process occurs.

An entry generating address 325 indicates the start address of the compilation result.

An exit address 326 indicates a return address of the execution code that is the compilation result. The exit address 326 indicates the position of the next byte code to be processed and will be an index for the optimization of the process in the compilation execution unit 19 described later when the process is called for a plurality of times.

Next, the generation of the entry point table 315 by the byte code interpretation unit 17 will be described.

The byte code interpretation unit 17 reads the Java program described with the Java byte code instruction and, upon finding a call instruction of the method, sets the start address of the method as the first entry point of that method. The byte code interpretation unit 17 then determines whether or not the entry point has already been registered to the entry point table 315.

The Case where the Entry Point has not been Registered

If the entry point has not been registered in the entry point table 315, the byte code interpretation unit 17 registers the start address of the method to the entry point 322 as the first entry of the entry point table 315. The byte code interpretation unit 17 then instructs the compilation execution unit 19 to execute the compilation. Afterward, the byte code interpretation unit 17 proceeds with the interpretation of the method. The byte code interpretation unit 17 then outputs the interpretation result to the program execution unit 18.

After creating the entry point, the byte code interpretation unit 17 proceeds with the interpretation of the method and, if detecting a branch of the method, identifies the compilation state flag 323 of the entry to determine whether or not the entry is on the way of compilation. If it is on the way of compilation, the byte code interpretation unit 17 keeps proceeding with the interpretation of the method. Afterward, for each time detecting the branch, the byte code interpretation unit 17 identifies that the compilation is ongoing and proceeds with the interpretation of the Java byte code. Then, upon detecting the return instruction of the method, the byte code interpretation unit 17 writes the address of the return instruction as the leave point 324 in the entry point table 315. Then, upon the completion of the interpretation of the method by the detection of the return instruction and after detecting the next method, the byte code interpretation unit 17 starts, to the detected method, the above described process that is for the case of having found the start of the method.

In contrast, if the entry is not on the way of compilation when the branch is detected, the byte code interpretation unit 17 writes the address of the branch instruction as the leave point 324 to the entry point table 315. Here, the return address designated in the leave point is the called method at the branch. Thus, the byte code interpretation unit 17 starts the above described process that is for the case of having found the start of the method.

Further, after the branch, if the flow returns to the previous method that occurred before the branch due to, for example, the return instruction, the byte code interpretation unit 17 sets, as the next entry point of the method, the address of the instruction code that is positioned next to the branch instruction. The byte code interpretation unit 17 then registers the start address of the method to the entry point 322 as the next entry of the entry point table 315. The byte code interpretation unit 17 then instructs the compilation execution unit 19 to execute the compilation of the entry which starts from the entry point. Afterward, the byte code interpretation unit 17 proceeds with the interpretation of the method. The byte code interpretation unit 17 then outputs the interpretation result to the program execution unit 18. Afterward, the byte code interpretation unit 17 repeats the above process for the branch. Then, upon detecting the return instruction of the method, the byte code interpretation unit 17 writes the address of the return instruction as the leave point 324 to the entry point table 315. Then, upon the completion of the interpretation of the method by the detection of the return instruction and after detecting the next method, the byte code interpretation unit 17 starts, to the method, the above described process that is for the case of having found the start of the method.

The Case where the Entry Point has been Registered

On the other hand, if the entry point has already been registered to the entry point table 315, the compilation state flag 323 is identified to determine whether or not the entry has been compiled. If it has been compiled, the byte code interpretation unit 17 identifies the entry generating address 325 and executes the compiled execution code that is located at the address described in the entry generation address 325. Afterward, the byte code interpretation unit 17 starts interpretation from the return address of the Java byte code designated at the leave point of the execution code. Here, the leave point corresponds to either the branch or the return instruction. For example, the leave point may be the (0xB1) "return" instruction and the call instruction such as (0xB6) "invokevirtual", or the position (address) where the instruction code such as (0xA7) "goto" instruction that changes the flow of the process occurs. As other examples, the leave point may be the instruction code such as "ifeq", "ifnull", "iflt", "ifle", "ifne", "ifnormull", "ifgt", "ifge", "if icmpeq", "if icmpne", "if icmplt", "if icmpgt", "if icmple", "if icmpge", "if acmpeq", "if acmpne", "goto", "goto w", "jsr", "jsr w", "ret", "lookupswitch", "tableswitch", "invokevirtual", "invokespecial", "invokestatic", "invokeinterface", "return", "ireturn", "lreturn", "freturn", "dreturn", "areturn" among the instruction codes defined in the Java virtual machine specification (http://java.sun.com/docs/books/jvms/second_edition/html/Mnemonics.doc.html). For example, the return address designated by the leave point is either the method called at the branch or the ending point of the method. If the return address is the called method, the byte code interpretation unit 17 starts the above described process for the case of having found the start of the method. If the return address is the ending position of the method, the byte code interpretation unit 17 proceeds with the interpretation of the Java byte code from that position and, when finding next method, starts the above process for the case of having found the start of the method.

Furthermore, the byte code interpretation unit 17 increments The entry counter 321 for every time creating one entry.

While performing the process of executing the Java byte code instruction described in the program, the byte code interpretation unit 17 repeats the above described creation process of the entry point for each method. Thereby, the byte code interpretation unit 17 can, along the flow of the execution of the program, extract and designate the entry to be used in the method as the object to be compiled.

If the byte code interpretation unit 17 again calls the entry that has been compiled, it embeds the call address of the execution code, which is the compilation result of the entry, into the Java byte code instruction corresponding to that entry. Then, the byte code interpretation unit 17 notifies the program execution unit 18 of the address of the corresponding execution code. The byte code interpretation unit 17 also notifies the compilation execution unit 19 of the embedding of the call address of the execution code.

Further, if the call address of the execution code corresponding to the method has been set in the Java byte code, the byte code interpretation unit 17 notifies the program execution unit 18 of the called address.

Further, the byte code interpretation unit 17 stores a threshold regarding the number of the method calls, where the threshold is a threshold for performing the optimization. The byte code interpretation unit 17 then counts up the number of the methods that have been called and identifies whether the counted number is above the threshold. If the number of the called methods is above the threshold, the byte code interpretation unit 17 notifies the compilation execution unit 19 to execute the optimization process for the method.

The byte code interpretation unit 17 performs the above process while performing to the Java work area unit 11 the interpretation of the Java byte code instruction and the reading and writing of the data for the creation of the method address table.

The compilation execution unit 19 receives the instruction to compile the entry from the byte code interpretation unit 17. At this time, the compilation execution unit 19 also receives the input of the method name and the entry point of the entry to be compiled from the byte code interpretation unit 17. The compilation execution unit 19 compiles the entries in the reception order of the compilation instructions. Here, in the present embodiment, since the compilation is performed by the CPU 200 that is one of the CPUs, it is difficult for the byte code interpretation unit 17 to compile the next entry before completing the compilation of the current entry. That is, it is difficult for the compilation execution unit 19 to always immediately start the compilation of the entry which is instructed to compile from the byte code interpretation unit 17. Therefore, as described above, even if the byte code interpretation unit 17 registers the entry point and immediately notifies the compilation execution unit 19 of the instruction of the compilation of the entry, it can designate the leave point by such as the branch of the entry afterward.

When performing compilation, the compilation execution unit 19 obtains functions from the function address table storage unit 16. Also, the compilation execution unit 19 reads and writes the data for the compilation process to the compilation work area unit 13 during the compilation execution.

When starting the compilation of the entry, the compilation execution unit 19 searches for the method address table by using the method name and entry point of the entry instructed to compile and specifies the designated entry. Afterward, the compilation execution unit 19 determines whether or not the leave point of the entry designated is registered in the method address table. If the leave point is not registered, the compilation execution unit 19 compiles the part from the entry point to the return instruction of the method including the entry all at once. If the leave point is registered, the compilation execution unit 19 compiles the part from the entry point to the leave point of the entry all at once. That is, if there were no designation of the leave point, the compilation execution unit 19 would compile the part after the entry point of the method all at once and, therefore, it would compile the part that is not used for the process of the program. In contrast, with the leave point being set, the compilation from the entry point to the leave point can be made along the execution of the program, so that redundant compilation can be reduced.

Also, upon starting the compilation of the designated entry, the compilation execution unit 19 sets to ON the compilation ongoing flag 352 (see FIG. 4) of the compilation state flag 323 (see FIG. 2) of the entry written in the entry point table 315.

Upon the completion of the compilation of the designated entry, the compilation execution unit 19 sets to ON the compilation done flag 353 (see FIG. 4) of the compilation state flag 323 (see FIG. 2) of the entry written in the entry point table 315. At this time, the compilation execution unit 19 sets the compilation ongoing flag 352 to OFF. Further, the compilation execution unit 19 instructs the compilation result storage unit 15 to store the execution code that is the compilation result of the entry. The compilation execution unit 19 then registers, to the entry generating address 325 of the entry point table 315, the start address of the execution code that is the compilation result of the entry. Further, the compilation execution unit 19 registers, to the exit address 326 of the entry point table 315, the return address of the execution code that is the compilation result of the entry.

Further, upon the completion of the compilation up to the return instruction of the method, the compilation execution unit 19 registers the start address of the execution code of the first entry of the method to the start address 312 (see FIG. 2) of the method in the method address table. Further, the compilation execution unit 19 sets to ON the flag 344 (see FIG. 3) of the execution flag 314 (see FIG. 2) of the method in the method address table.

Further, for the method that have been called twice or more, the compilation execution unit 19 sets the flag 342 of the execution flag 314 to ON. The flag 342 indicates whether or not the optimization is executed.

Also, upon receiving the notification regarding the embedment of the call address of the execution code from the byte code interpretation unit 17, the compilation execution unit 19 sets to ON the flag 343 of the execution flag 314 in the method represented by the execution code.

Also, the compilation execution unit 19 receives the notification of the execution of the optimization process of the method from the byte code interpretation unit 17. The compilation execution unit 19 then obtains from the compilation result storage unit 15 the compilation result of each entry written in the entry point table 315 of the designated method. The compilation execution unit 19 then performs the optimization process to the obtained execution codes. For example, the compilation execution unit 19 performs the optimization process by combining the obtained execution codes. Here, in order to track the execution route of the program, the compilation execution unit 19 identifies the exit address 326 of each entry and specifies where the next entry is. Here, "execution route" refers to the order of the executed intermediate code instructions when the intermediate code instructions have actually been executed along the content of the instruction. Thereby, the compilation execution unit 19 can readily know the execution route of the program without identifying all the execution code and, therefore, can easily obtain the set of the entries to be combined. Then, upon the completion of the optimization, the compilation execution unit 19 sets to ON the flag 351 (see FIG. 4) of the compilation state flag 323 (see FIG. 2) of the optimized entry in the entry point table 315. Further, the byte code interpretation unit 17 sets to ON the flag 341 (see FIG. 3) of the execution flag 314 of the optimized method. Here, although the descriptions have been provided with the example of the process for combining the entries as the optimization process in the present embodiment, any optimization processes that have been realized in the known compiler techniques may be used for this optimization process.

The program execution unit 18 has a function of executing the process along the content described in the Java byte code instruction or the execution code. The program execution unit 18 receives the input of the interpretation result of the Java byte code instruction made by the byte code interpretation unit 17. This refers to the case where the Java byte code instruction to be interpreted by the byte code interpretation unit 17 has not yet been compiled. The program execution unit 18 then executes the process based on the interpretation, which has been made by the byte code interpretation unit 17, of the Java byte code instruction.

Also, the program execution unit 18 receives the execution instruction of the execution code from the byte code interpretation unit 17. This refers to the case where the Java byte code instruction to be interpreted by the byte code interpretation unit 17 has already been compiled. This may include the case where all the methods to be interpreted have been compiled and the case where, in the method to be interpreted, the entry to be further interpreted has been compiled. Further, the case where all the methods to be interpreted have been compiled refers to the case where the flag 344 of the execution flag 314 is ON or the flag 343 of the execution flag 314 is ON, that is, the calling address of the execution code is embedded in the Java byte code instruction. In addition, the case where the entry to be interpreted has been compiled refers to the case where the flag 353 of the compilation state flag 323 of the entry of the entry point table 315 is ON. The program execution unit 18 then reads from the compilation result storage unit 15 the execution code for which the execution instruction has been received. The program execution unit 18 then executes the process based on the read execution code.

Then, in executing the process based on the interpretation of the Java byte code and the process based on the execution code, the program execution unit 18 reads and writes the data in the execution of the process by using the Java work area unit 11. Also, the program execution unit 18 also reads the functions used for the process from the run time library and use them.

Figure 5:
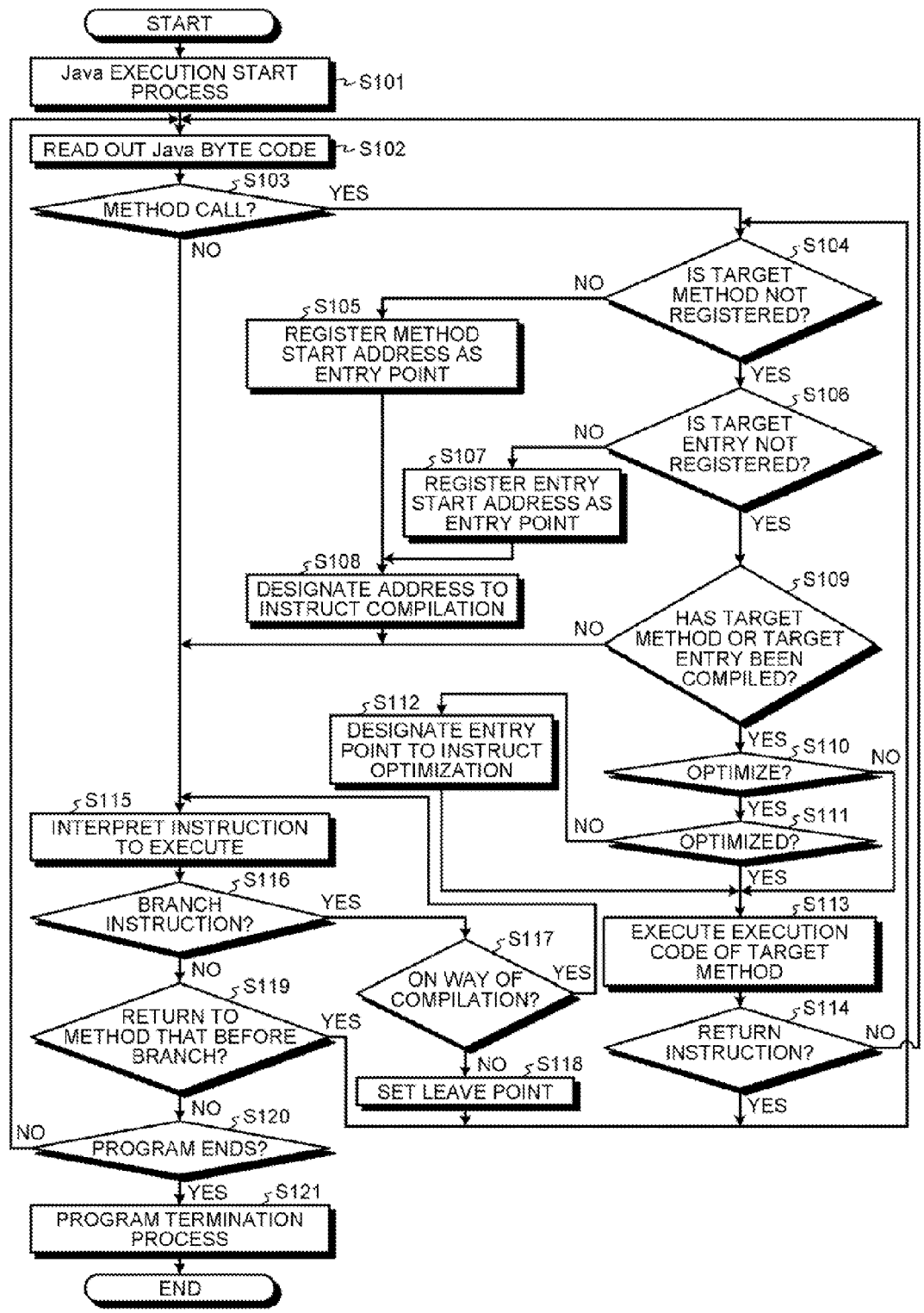
FIG. 5 is a flowchart of a main process.

Next, by referring to FIG. 5, the main process of the Java program execution in the information processing apparatus of the present embodiment will be described. FIG. 5 is the flowchart of the main process.

In response to the execution start instruction of the Java program, the CPU 100 performs the Java execution start process such as the start-up of the Java VM (step S101). The start-up of the Java VM causes the byte code interpretation unit 17 to start up.

The byte code interpretation unit 17 reads out the Java byte code instruction from the Java byte code instruction memory unit 14 (step S102).

The byte code interpretation unit 17 determines whether or not the read byte code instruction is the call of the method (step S103).

If it is the call of the method (step S103: Yes), the byte code interpretation unit 17 determines whether or not the target method has not been registered in the method address table (step S104). Here, the target method refers to a method subjected to the determination as to whether or not to be compiled.

Then, if the target method has not been registered (step S104: No), the byte code interpretation unit 17 registers the start address of the target method as the entry point of the first entry of the target method (step S105).

In contrast, the target method has been registered (step S104: Yes), the byte code interpretation unit 17 determines whether or not the target entry has not been registered in the entry point table (step S106). Here, the target entry refers to an entry subjected to the determination as to whether or not to be compiled.

Then, the target entry has not been registered (step S106: No), the byte code interpretation unit 17 registers the start address of the target entry as the entry point (step S107).

Then, the byte code interpretation unit 17 designates as the compilation target the address that has been registered as the entry point and instructs the compilation execution unit 19 to execute the compilation (step S108).

In contrast, if the target entry has been registered (step S106: Yes), the byte code interpretation unit 17 refers to the execution flag in the method address table to determine whether or not the target entry has been compiled (step S109). If the target entry has been compiled (step S109: Yes), the byte code interpretation unit 17 determines whether or not to perform the optimization according to whether or not the number of calls of the target method exceeds the threshold (step S110).

If performing the optimization (step S110: Yes), the byte code interpretation unit 17 refers to the execution flag in the method address table to determine whether or not the target method has been optimized (step S111). If the optimization has not been done (step S111: No), the byte code interpretation unit 17 designates the entry point of the first entry of the method and instructs the compilation execution unit 19 to execute the optimization (step S112). In contrast, if not performing the optimization (step S110: No) and if optimization has been done (step S111: Yes), the byte code interpretation unit 17 instructs the program execution unit 18 to execute the execution code of the target method. The program execution unit 18 executes the designated execution code (step S113).

Next, the byte code interpretation unit 17 determines whether or not the end of the execution code is the return instruction (step S114). If it is the return instruction (step S114: Yes), the byte code interpretation unit 17 returns to step S104. In contrast, if it is not the return instruction (step S114: No), the byte code interpretation unit 17 defines the next instruction in the Java byte code of the entry expressed by the executed execution code as the target entry and returns to step S102.

On the other hand, if it is not the call of the method (step S103: No), if the step S108 has been processed, and if the target entry has not been compiled (step S109: No), the byte code interpretation unit 17 interprets the Java byte code instruction. Then, the program execution unit 18 executes the interpreted Java byte code instruction (step S115).

Afterward, the byte code interpretation unit 17 determines whether or not the branch instruction is detected (step S116). If the branch instruction is detected (step S116: Yes), the byte code interpretation unit 17 determines whether or not the entry including the branch instruction is on the way of compilation (step S117). If the entry is on the way of compilation (step S117: Yes), the byte code interpretation unit 17 returns to step S115.

In contrast, if the entry is not on the way of compilation (step S117: No), the byte code interpretation unit 17 registers the address of the branch instruction as the leave point to the entry point table (step S118). Then, the byte code interpretation unit 17 defines the called method at the branch as the target method, defines the first entry of the called method as the target entry, and returns to step S104.

In contrast, if the branch instruction is not detected (step S116: No), the byte code interpretation unit 17 determines at the end of the interpreted method whether the method is called by the branch of other method and whether or not to return to the previous method that occurred before the branch (step S119). If returning to the previous method that occurred before the branch (step S119: Yes), the previous method that occurred before the branch is defined as the target method and the instruction after the instruction of the previous method that occurred before the branch is defined as the target entry, and the flow returns to step S104.

In contrast, if not returning to the previous method that occurred before the branch (step S119: No), the byte code interpretation unit 17 determines whether or not the program ends (step S120).

If the program does not end (step S120: No), the byte code interpretation unit 17 returns to step S102.

In contrast, if the program ends (step S120: Yes), the CPU 100 terminates the execution process of the program (step S121).

Figure 6:
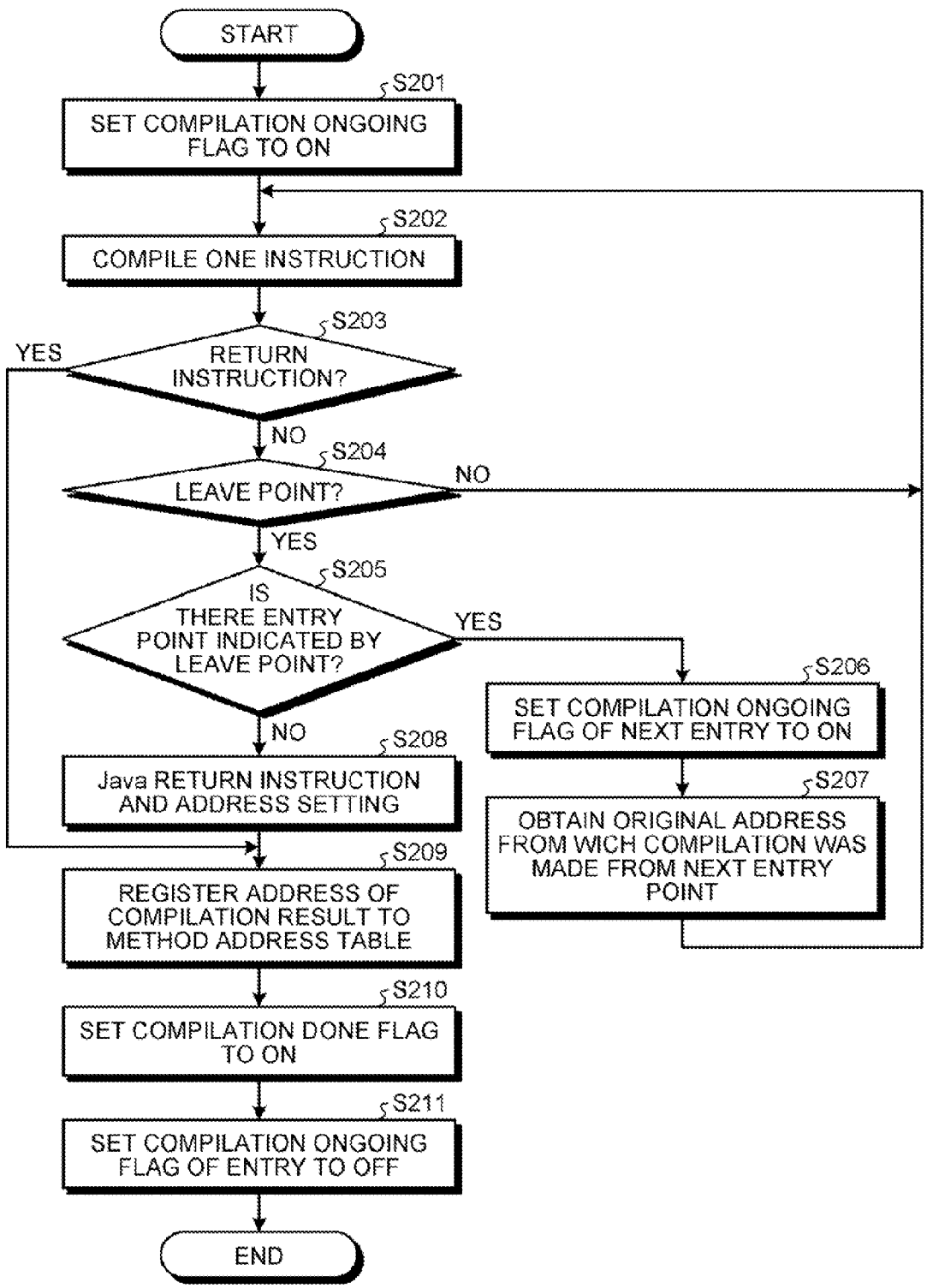
FIG. 6 is a flowchart of a compilation process.

Next, by referring to FIG. 6, the compilation process of the information processing apparatus of the present embodiment will be described. FIG. 6 is a flowchart of the compilation process.

The compilation execution unit 19 receives the instruction of the compilation execution of the entry from the byte code interpretation unit 17. Then, the compilation execution unit 19 sets the compilation ongoing flag of the compilation state flags of the entry to ON (step S201).

The compilation execution unit 19 compiles one Java byte code instruction (step S202).

Next, the compilation execution unit 19 determines whether or not the next Java byte code instruction is the return instruction (step S203).

If it is the return instruction (step S203: Yes), the compilation execution unit 19 proceeds to step S209.

In contrast, if it is not the return instruction (step S203: No), the compilation execution unit 19 determines whether or not the next Java byte code instruction is the leave point (step S204).

If it is not the leave point (step S204: No), the compilation execution unit 19 returns to step S202.

In contrast, if it is the leave point (step S204: Yes), the compilation execution unit 19 determines whether or not the entry point indicated by the leave point exists in the method address table (step S205).

If the leave point exists (step S205: Yes), the compilation execution unit 19 sets to ON the compilation ongoing flag of the compilation state flags of the next entry whose start address is the entry point indicated by the leave point (step S206). Then, the compilation execution unit 19 obtains from the next entry point the original address from which the compilation was made, that is, the address of the Java byte code instruction to be compiled (step S207). Then, the compilation execution unit 19 returns to step S202.

In contrast, if the leave point does not exist (step S205: No), the compilation execution unit 19 sets the Java return instruction and the return address at the leave point of the entry that is currently being compiled (step S208).

Then, the compilation execution unit 19 registers, to the start address of the method address table, the address of the compilation result, that is, the address of the first entry point of the method (step S209).

Then, the compilation execution unit 19 sets the compilation done flag of the compilation state flags for each compiled entry to ON and, further, sets the compilation done flag of the execution flags of the method to ON (step S210).

Also, the compilation execution unit 19 sets the compilation done flag of the compilation state flags for each compiled entry to OFF (step S211).

Figure 7:
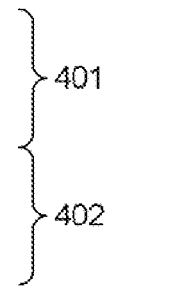
FIG. 7 is a diagram illustrating a source code of a sample program described in the Java programming language.
Figure 9:
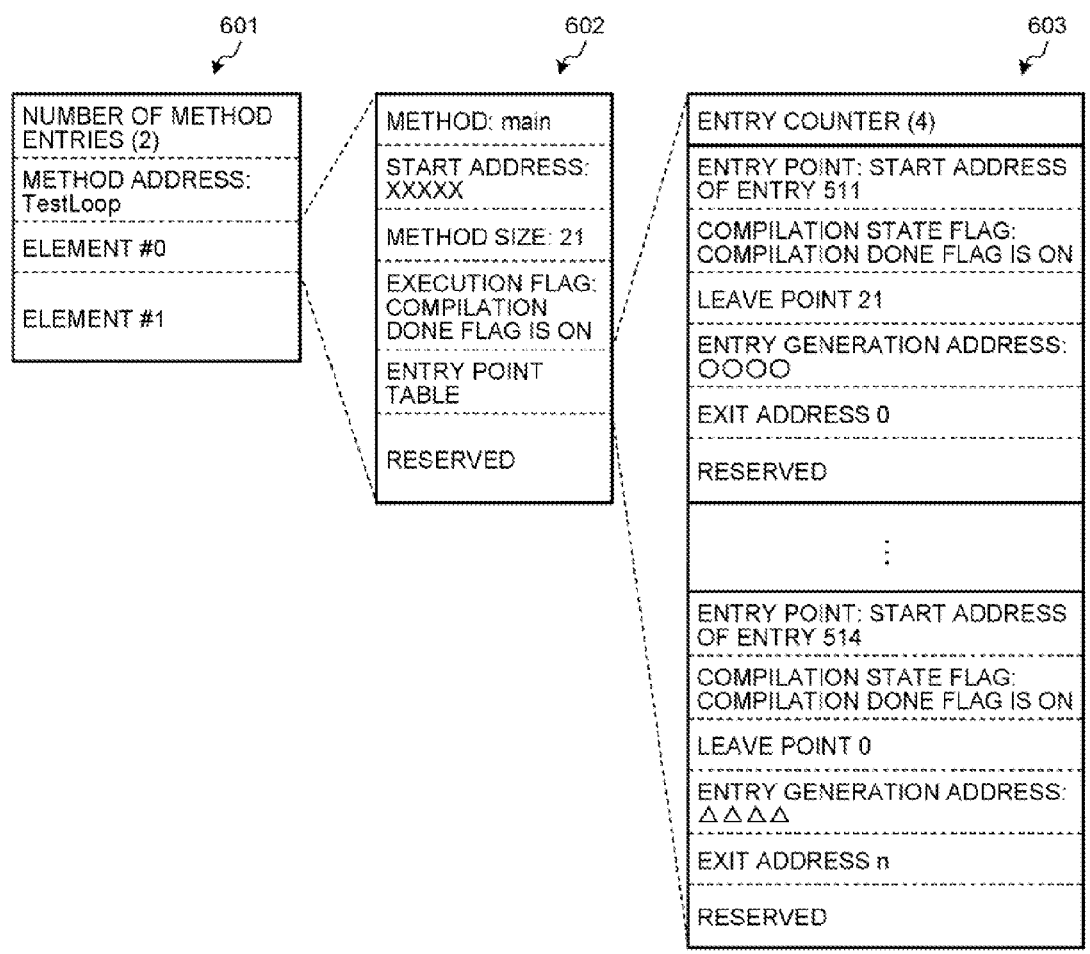
FIG. 9 is a diagram illustrating a method address table generated from the sample program.

Next, by referring to FIG. 7 to FIG. 10B, described will be the entire flow of the process of the information processing apparatus of the present embodiment with an example of a sample program. FIG. 7 is a diagram illustrating a source code of the sample program described in the Java programming language. FIG. 8 is a diagram illustrating the abstract of the Java compilation result of the sample program. FIG. 9 is a diagram illustrating the method address table generated from the sample program. FIG. 10A is a first diagram illustrating the execution code generated from the sample program. FIG. 10B is a second diagram illustrating the execution code generated from the sample program. FIG. 10B is the subsequent portion of FIG. 10A.

As illustrated in FIG. 7, the sample program used here is made of one class file. The class file has two methods of a method 401 and a method 402.

The code indicated in FIG. 8 is the Java byte code into which the source code of the sample program of FIG. 7 is complied and converted.

The program described in the Java byte code as indicated in FIG. 8 is stored in the Java byte code instruction memory unit 14.

It is then recognized by the byte code interpretation unit 17 that the program of FIG. 8 is it is made up of entries 501 to 504 and 511 to 514. The method 401 of FIG. 7 corresponds to the entries 501 to 504 and the method 402 corresponds to the entries 511 to 514.

Specifically, since the branch by condition occurs at the next line to the entry 501 (the line including the instruction code of (0xA2) "icmpge") and becomes the leave point, the entry 501 is one entry. Further, since the branch to call the method 402 occurs at the next line to the entry 502 (the line including the instruction code of (0xB8) "invokestatic") and becomes the leave point, the entry 502 is one entry. Further, since the branch to other line occurs at the next line to the entry 503 (the line including the instruction code of (0xA7) "goto") and becomes the leave point, the entry 503 is one entry. Then, because there is no branch after the entry 503 until the return instruction of the method 401, the part after the entry 503 up to the return instruction is one entry 504.

Also, since the branch by the condition occurs at the next line to the entry 511 (the line including the instruction code of (0xA2) "icmpge") and becomes the leave point, the entry 511 is one entry. Also, since the branch to call the method 401 occurs at the next line to the entry 512 (the line including the instruction code of (0xB8) "invokestatic") and becomes the leave point, the entry 512 is one entry. Further, since the branch to other line occurs at the next line to the entry 513 (the line including the instruction code of (0xA7) "goto") and becomes the leave point, the entry 513 is one entry. Then, there is no branch after the entry 513 until the return instruction of the method 402, the part after the entry 513 up to the return instruction is one entry 514.

Then, based on the entries 501 to 504 and 511 to 514 in FIG. 8, the method address table generated by the byte code interpretation unit 17 is the method address table presented in FIG. 9. A table 602 in FIG. 9 represents the content of the element #0 in an method address table 601. Also, a table 603 represents the content of the entry point table in the table 602. Also, the method address table in FIG. 9 represents a state that the compilation has been done by the compilation execution unit 19 after the setting of the entry points and the leave points by the byte code interpretation unit 17 have been done.

First, since there are two methods of the methods 401 and 402, the areas for elements #0 and #1 are reserved correspondingly to respective methods. In FIG. 9, the element #0 corresponds to the method 402 and the element #1 corresponds to the method 401.

Then, as a method name, the element #0 is registered with "main" that is the name of the method 402, for example. Also, as a start address, the start address of the method 402 is registered. Also, as a method size, "21" that is the size of the method 402 is registered. Also, as an execution flag, the compilation done flag has been set to ON by the compilation execution unit 19.

Then, the table 603 is the entry point table that has been generated by the byte code interpretation unit 17 based on the entries 501 to 504 and 511 to 514 of FIG. 8.

Because the number of all the entries in the method 401 is four, the byte code interpretation unit 17 sets the entry counter to "4". Further, the byte code interpretation unit 17 registers the start address of the entry 511 as the entry point of the first entry. Further, because the compilation of the first entry has begun, the compilation done flag has been set to ON by the compilation execution unit 19. The byte code interpretation unit 17 then registers as the leave point the address of "21" that is the address of the branch of the entry 511. Further, as the entry generation address, the start address of the execution code with which the entry 511 has been compiled has been registered by the compilation execution unit 19. As the exit address, the return address of the execution code with which the entry 511 has been compiled has been registered by the compilation execution unit 19.

Similarly, the byte code interpretation unit 17 performs the registration of the entries 512 to 514. The compilation execution unit 19 performs the setting of the execution flag of the entries 512 to 514, the registration of the entry generation address and the registration of the exit address. Here, the depiction is omitted regarding the registration for the entries 512 and 513 in the entry point table in FIG. 9.

Then, the result of the compilation of the Java byte code instruction made by the compilation execution unit 19 by using the method address table 601 as illustrated in FIG. 9 is the program of the execution code described in FIG. 10A and FIG. 10B. An execution code 701 correspond to the entry 513. An execution code 702 corresponds to the entry 514. Also, an execution code 703 corresponds to the entry 501. Also, an execution code 704 corresponds to the entry 502. Also, an execution code 705 corresponds to the entry 511. Also, an execution code 706 corresponds to the entry 512. Also, an execution code 707 corresponds to the entry 503. Also, an execution code 708 corresponds to the entry 504. In such a way, the processes to be actually executed only are subjected to be compiled, so that the consumption of the compilation time and the memory resource can be suppressed.

Hardware Configuration

Figure 11:
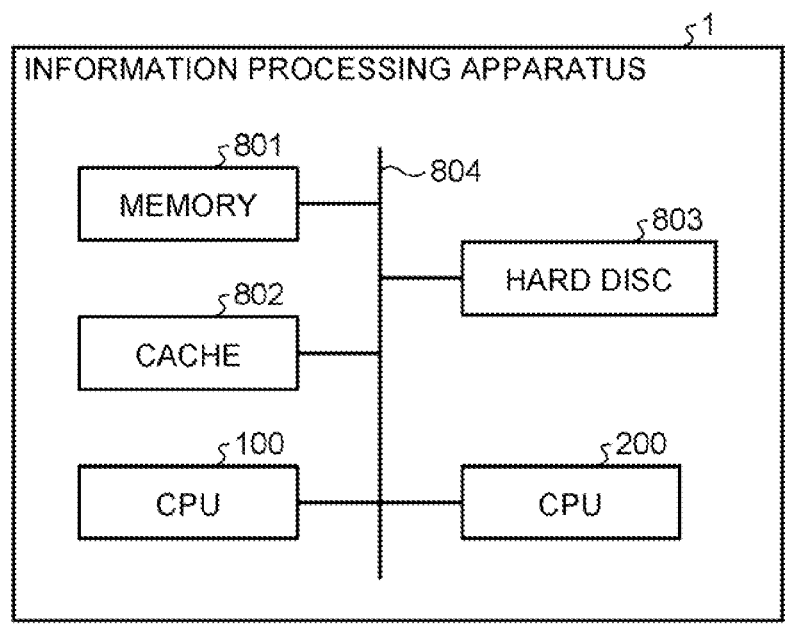
FIG. 11 is a hardware configuration diagram of the information processing apparatus according to the embodiment.

By referring to FIG. 11, the hardware configuration of the information processing apparatus of the present embodiment will be described below. FIG. 11 is the hardware configuration diagram of the information processing apparatus of the present embodiment.

As depicted in FIG. 11, the information processing apparatus 1 of the present invention has a memory 801, a cache 802, a hard disc 803, the CPU 100 and the CPU 200.

The memory 801, the cache 802, the hard disc 803, the CPU 100 and the CPU 200 are interconnected by a bus 804.

In the hard disc 803, stored are the program described in the Java byte code instruction, the run time library, and so on. Further, in the hard disc 803, stored are various programs for implementing the functions of the information processing apparatus 1 as illustrated in FIG. 1.

Then, the CPU 100 reads out and executes these various programs. Thereby, the Java VM is expanded on the memory 801. The CPU 100 controls the Java VM to implement the functions of the byte code interpretation unit 17. Further, in response to the instruction from the Java VM, the CPU 200 starts the compiler that has the functions of the compilation execution unit 19.

Also, the CPU 100 reads the program described in the Java byte code instruction and the run time library to expand them on the memory 801. Thereby, the memory 801 can implement the functions of the Java byte code instruction memory unit 14.

The memory 801 and the cache 802 implement the functions of the Java work area unit 11, the compilation work area unit 13, the compilation result storage unit 15 and the function address table storage unit 16.

It is noted that the above programs for implementing the functions of the information processing apparatus 1 as illustrated in FIG. 1 are not stored in the hard disc 803. For example, the programs may be stored in a "portable physical media" such as a flexible disc, a CD-ROM (Compact Disk Read Only Memory), a DVD (Digital Versatile Disk) or an IC (Integrated Circuit) card, and the like that can be inserted into the information processing apparatus 1. Alternatively, the programs may be stored in a "fixed physical media" such as a hard disc drive provided outside the information processing apparatus 1. Alternatively, the programs may be stored in "other computer (or server)" connected to the information processing apparatus 1 via the public circuit, the Internet, LAN, WAN, and the like. The information processing apparatus 1 may read out and execute each program from the above described flexible disc, for example.

As described above, in the information processing apparatus of the present embodiment, when the execution request for processing the program is generated, the byte code interpretation unit and the program execution unit can immediately start the execution without waiting the compilation, so that the waiting time before starting execution can be reduced. Further, after the completion of the compilation, the direct execution of the compilation result by the CPU can be performed, which allows for the process to be executed at a higher speed. Further, in the multi-core system, when data such as a table is shared among the different CPUs, synchronization and interlock among the CPUs are performed in order to avoid the access contention for the same data, which often causes the degradation of the processing performance. In contrast, in the information processing apparatus of the present embodiment, the CPUs do not write the same information each other and no data-inconsistency occurs, so that the synchronization or the interlock process among the CPUs are not executed. Thereby, in the information processing apparatus of the present embodiment, the execution and compilation of the Java programs using the multi-core system can be efficiently performed.

Further, the information processing apparatus of the present embodiment, the different CPU from the CPU which performs the interpretation and execution of the Java byte code performs the compilation process independently. Therefore, even if the load of the compilation process is high, this does not affect the process of the interpretation and execution of the Java byte code, so that the high speed processing can be achieved.

In addition, although the above descriptions have been provided with the case of two CPUs as the multi-core system, the same process can be applied for the case of three or more CPUs. For example, the compilation can be executed on a basis of method at a plurality of CPUs, so that the compilation process can be further increased in speed.

According to one embodiment of the information processing apparatus, the method of controlling the information processing apparatus, and the program for executing the intermediate code instructions disclosed in the present application, the advantage that the execution and compilation of the Java program can be efficiently performed is attained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
at least two CPUs; and
a storage unit that stores a compilation result of an intermediate code instruction, wherein
one CPU comprises:
an intermediate code interpretation unit that sequentially reads, from a predetermined program described with intermediate code instructions, the intermediate code instructions along an execution route that is an order to execute each intermediate code instruction; determining whether or not there is a compilation result of the intermediate code instruction that has been read in the storage unit; when there is no compilation result of the intermediate code instruction, interpreting the intermediate code instruction; and, when there is a compilation result of the intermediate code instruction, designating the compilation result; and
a program execution unit that, when an interpretation result of the intermediate code instruction is received from the intermediate code interpretation unit, executes the program by executing the intermediate code instruction based on the interpretation result and, when a designation of a compilation result is received from the intermediate code interpretation unit, executes the program by executing a native code that is the designated compilation result, and
the other CPU comprises:
a compilation execution unit that compiles the intermediate code instruction interpreted by the intermediate code interpretation unit to generate a native code and stores the generated native code in the storage unit.

2. The information processing apparatus according to claim 1, wherein
the intermediate code interpretation unit designates an intermediate code instruction group to be interpreted that represents a set of work procedures that is a part of the program and specifies a division instruction group to be interpreted among a divided method divided from the method on for each branch in the designated intermediate code instruction group, and
the compilation execution unit compiles the division instruction group specified in the intermediate code instruction group designated by the intermediate code interpretation unit.

3. The information processing apparatus according to claim 2, wherein
for each time when starting interpretation of the intermediate code instruction group, the intermediate code interpretation unit instructs the compilation execution unit to compile an intermediate code instruction group to which an interpretation has been started; upon detecting a branch in the intermediate code instruction group to which the interpretation has been started, detects whether or not a compilation unit has been started by the compilation execution for the intermediate code instruction group to which the interpretation has been started; and, when the compilation has not been started, divides a method at the detected branch to specify the division instruction group to be interpreted, and
the compilation execution unit sequentially accepts instructions for compilation of a plurality of the intermediate code instruction groups from the intermediate code interpretation unit; starts compiling the intermediate code instruction groups in an order of accepting the instructions; when the division instruction group is designated in the intermediate code instruction group to which the compilation has been started, compiles the division instruction group; and, when the division instruction group is not designated in the intermediate code instruction group to which the compilation has been started, compiles, as one division instruction group, an intermediate code instruction group to which the compilation has been started.

4. An method of controlling an information processing apparatus comprising two CPUs, the method causing a computer to execute processes of:
by one CPU, sequentially reading, from a predetermined program described by intermediate code instructions, the intermediate code instructions along an execution route that is an order to execute each intermediate code instruction, and determining whether or not there is a compilation result of the intermediate code instruction that has been read in the storage unit, the storage unit configured to store a compilation result of the intermediate code instruction;
when there is no compilation result of the intermediate code instruction, interpreting the intermediate code instruction and executing the intermediate code instruction based on an interpretation result by the one CPU, while compiling the interpreted intermediate code instruction to generate a native code and storing the generated native code in a storage unit by the other CPU; and
when there is a compilation result of the intermediate code instruction, by the one CPU, designating the compilation result and executing the native code that is the designated compilation result.

5. A computer-readable recording medium having stored therein an intermediate code instruction execution program for causing a computer comprising two CPUs to execute a process comprising:
causing one CPU to sequentially read, from a predetermined program described by intermediate code instructions, the intermediate code instructions along an execution route that is an order to execute each intermediate code instruction, and determine whether or not there is a compilation result of the intermediate code instruction that has been read in a storage unit, the storage unit configured to store a compilation result of the intermediate code instruction;

when there is no compilation result of the intermediate code instruction, causing the one CPU to interpret the intermediate code instruction and execute the intermediate code instruction based on an interpretation result, while causing the other CPU to compile the interpreted intermediate code instruction to generate a native code and store the generated native code in a storage unit; and when there is a compilation result of the intermediate code instruction, causing the one CPU to designate the compilation result and execute the native code that is the designated compilation result.

* * * * *